(12) United States Patent
Itou et al.

(10) Patent No.: US 12,091,261 B2
(45) Date of Patent: Sep. 17, 2024

(54) CONVEYANCE APPARATUS, CONVEYANCE METHOD AND FOOD PRODUCTION METHOD

(71) Applicant: NICHIREI FOODS INC., Tokyo-to (JP)

(72) Inventors: Ryuichi Itou, Chiba (JP); Minoru Mamiya, Chiba (JP); Suguru Hirayama, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 289 days.

(21) Appl. No.: 17/762,300

(22) PCT Filed: Sep. 28, 2020

(86) PCT No.: PCT/JP2020/036598
§ 371 (c)(1),
(2) Date: Mar. 21, 2022

(87) PCT Pub. No.: WO2021/065786
PCT Pub. Date: Apr. 8, 2021

(65) Prior Publication Data
US 2022/0411198 A1 Dec. 29, 2022

(30) Foreign Application Priority Data
Oct. 3, 2019 (JP) .................. 2019-183060

(51) Int. Cl.
*B65G 47/06* (2006.01)
*B65G 43/08* (2006.01)

(52) U.S. Cl.
CPC ............ *B65G 47/06* (2013.01); *B65G 43/08* (2013.01); *B65G 2201/0202* (2013.01); *B65G 2203/044* (2013.01)

(58) Field of Classification Search
CPC ............................. B65G 47/06; B65G 43/08; B65G 2201/0202; B65G 2203/044
See application file for complete search history.

(56) References Cited

U.S. PATENT DOCUMENTS 4,591,044 A * 5/1986 Ogami .............. H01L 21/68742
198/689.1
6,530,467 B2 * 3/2003 Arai ....................... B21D 43/12
271/193
2010/0310342 A1 * 12/2010 Yang ................. H01L 21/67748
414/222.01

FOREIGN PATENT DOCUMENTS

CN 104444297 A 3/2015
CN 108589510 A 9/2018
(Continued)

OTHER PUBLICATIONS

JPH0222927U (Year: 1990).*
(Continued)

*Primary Examiner* — Gene O Crawford
*Assistant Examiner* — Lester Rushin, III
(74) *Attorney, Agent, or Firm* — Birch, Stewart, Kolasch & Birch, LLP

(57) ABSTRACT

A conveyance apparatus, a conveyance method and a food production method that enable to accurately place a conveyance object on a conveyance body while enabling the conveyance object to be conveyed at high speed by the conveyance body are provided. A catcher is moved to be arranged in a raised position where a placement surface is located above a conveyance surface, and in a lowered position where the placement surface is located at a same height as the conveyance surface or where the placement surface is located below the conveyance surface. A conveyance object supply unit places a first conveyance object onto the placement surface in such a manner that the first con-
(Continued)

veyance object is received by the placement surface above the conveyance surface. The catcher is moved from the raised position toward the lowered position so that the first conveyance object is conveyed downstream by the conveyance body.

8 Claims, 7 Drawing Sheets

(56) References Cited

FOREIGN PATENT DOCUMENTS

| CN | 208932471 U | 6/2019 |
|----|-------------|--------|
| JP | 60-169148 A | 9/1985 |
| JP | 2-22927 U | 2/1990 |
| JP | 4-39214 A | 2/1992 |
| JP | 3032110 U | 12/1996 |
| JP | 2003-52299 A | 2/2003 |
| JP | 2004-129524 A | 4/2004 |

OTHER PUBLICATIONS

JP04-039214 (Year: 1992).*
English translation of the International Preliminary Report on Patentability and Written Opinion of the International Searching Authority for International Application No. PCT/JP2020/036598, dated Apr. 14, 2022.
International Search Report for PCT/JP2020/036598 (PCT/ISA/210) mailed on Dec. 1, 2020.
Written Opinion of the International Searching Authority for PCT/JP2020/036598 (PCT/ISA/237) mailed on Dec. 1, 2020.

* cited by examiner

CONVEYANCE APPARATUS, CONVEYANCE METHOD AND FOOD PRODUCTION METHOD

TECHNICAL FIELD

The present disclosure relates to a conveyance apparatus, a conveyance method and a food production method.

BACKGROUND ART

There are known apparatuses that convey conveyance objects, such as foodstuffs, downstream with a conveyor.

For example, Patent Literature 1 discloses an apparatus for wrapping food dough that continuously sends products in which bean paste (i.e., an inner material) is wrapped with a dough (i.e., an outer skin material).

CITATION LIST

Patent Literature

Patent Literature 1: Japanese patent application publication No. 2004-129524

SUMMARY OF INVENTION

Technical Problem

In the apparatus of Patent Literature 1, a product in which an inner material is wrapped with an outer skin material is cut by a cutter body, is placed on a belt that moves up and down together with an upper stand and a lower stand, and is conveyed to a next process by the belt.

In a case where the belt is stopped in accordance with the supply timing of the conveyance products in the apparatus that conveys conveyance objects such as products with the belt in this manner, the belt repeats intermittent movement and stop. When the belt is intermittently stopped, it is also necessary to stop the belt upstream and downstream from the point where conveyance objects are placed on the belt. The intermittent stop operation of the belt performed in this manner can become a bottleneck that prevents a conveyance object from being conveyed at high speed, which can hinder the improvement of productivity in the entire system. In addition, in a case where the belt is intermittently stopped in order to newly place a conveyance object on the belt in a state where a preceding conveyance object is already on the belt, there is concern that the preceding object may be affected by inertia to roll unintentionally on the belt.

On the other hand, in a case where a conveyance object such as a product is supplied onto the belt while a state where the belt is moved without being stopped is maintained, it is not easy to accurately place the conveyance object on a desired section of the belt. In particular, in a case where a conveyance object is dropped on a belt moving horizontally, even if the conveyance object lands on a desired section of the belt, the conveyance object may roll on the belt to move from the desired section under the influence of inertia.

The present disclosure has been contrived in view of the above-mentioned circumstances, an object of the present disclosure is to provide a technology that enables to accurately place a conveyance object on a conveyance body while enabling the conveyance object to be conveyed at high speed by the conveyance body.

Solution to Problem

An aspect of the present disclosure is directed to a conveyance apparatus comprising: a conveyor which includes a conveyance body having a conveyance surface, the conveyance body being moved in a conveyance direction; a catcher which has a placement surface; and a conveyance object supply unit which places a first conveyance object onto the placement surface, wherein: the catcher is moved to be arranged in a raised position where the placement surface is located above the conveyance surface, and in a lowered position where the placement surface is located at a same height as the conveyance surface or where the placement surface is located below the conveyance surface, the conveyance object supply unit places the first conveyance object onto the placement surface in such a manner that the first conveyance object is received by the placement surface above the conveyance surface, and the catcher is moved from the raised position toward the lowered position in a state where the first conveyance object is placed on the placement surface, so that the first conveyance object is received by the conveyance surface and is conveyed downstream by the conveyance body.

The conveyor may include a plurality of conveyance bodies located away from each other in a horizontal direction, and when the catcher is moved between the raised position and the lowered position, at least a part of the catcher may pass through a space between conveyance bodies adjacent to each other.

The catcher may include: a main body portion extending in a horizontal direction; and a plurality of protruding portions which are provided to protrude upward from the main body portion, each of the plurality of protruding portions may constitute the placement surface, and the conveyance body may be positioned between protruding portions in a state where the catcher is arranged in the raised position.

The catcher may include a groove section on the placement surface, the groove section extending in a direction which is not parallel to the conveyance direction.

The conveyance object supply unit may include: a mold which has a molding space; and a release unit which applies a force to the first conveyance object positioned in the molding space in such a manner that the first conveyance object is released toward the placement surface.

The conveyance body may be moved in the conveyance direction in a state where a second conveyance object is placed on the placement surface, the catcher may be moved from the lowered position to the raised position in such a manner that the second conveyance object is placed onto the placement surface of the catcher arranged in the raised position, and the conveyance object supply unit may place the first conveyance object onto the placement surface in such a manner that the first conveyance object lands on the second conveyance object placed on the placement surface.

The second conveyance object may be a flexible sheet-like member.

The first conveyance object may be a paste-like foodstuff.

Another aspect of the present disclosure is directed to a conveyance method including the steps of: causing a conveyance body which is included in a conveyor and has a conveyance surface to move in a conveyance direction; causing a catcher having a placement surface to move from a lowered position where the placement surface is located at a same height as the conveyance surface or where the placement surface is located below the conveyance surface, to a raised position where the placement surface is located above the conveyance surface; causing a conveyance object supply unit to place a first conveyance object onto the placement surface in such a manner that the first conveyance object is received by the placement surface above the conveyance surface; and causing the catcher to move from the raised position toward the lowered position in a state where the first conveyance object is placed on the placement surface in such a manner that the first conveyance object is received by the conveyance surface and is conveyed downstream by the conveyance body.

Another aspect of the present disclosure is directed to a food production method including the steps of: causing a conveyance body which is included in a conveyor and has a conveyance surface to move in a conveyance direction; causing a catcher having a placement surface to move from a lowered position where the placement surface is located at a same height as the conveyance surface or where the placement surface is located below the conveyance surface, to a raised position where the placement surface is located above the conveyance surface; causing a conveyance object supply unit to place a first conveyance object onto the placement surface in such a manner that the first conveyance object is received by the placement surface above the conveyance surface; and causing the catcher to move from the raised position toward the lowered position in a state where the first conveyance object is placed on the placement surface in such a manner that the first conveyance object is received by the conveyance surface and is conveyed downstream by the conveyance body, wherein the first conveyance object is a food.

According to the present disclosure, a conveyance object is enabled be accurately placed on a conveyance body while the conveyance object is enabled to be conveyed at high speed by the conveyance body.

DESCRIPTION OF EMBODIMENTS

Figure 1:
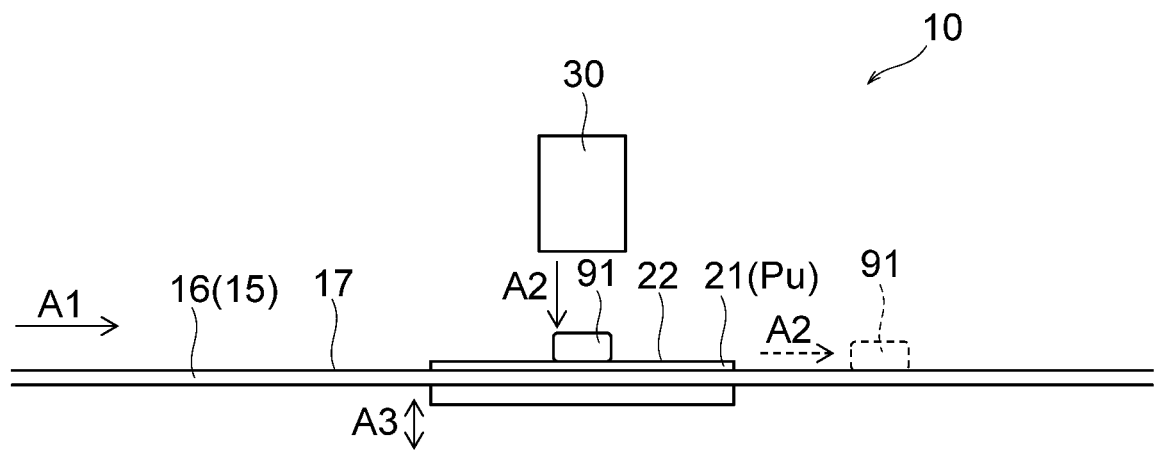
FIG. 1 is a side view schematically showing an example of a conveyance apparatus according to a first embodiment.

Typical embodiments are explained below as examples with reference to the drawings. For the convenience of illustration in the drawings and understanding, the sizes and the scales of elements shown in each drawing do not always correspond to the real things and do not always correspond between drawings. However, a person skilled in the art could clearly grasp the configuration and effect of the elements shown in each drawing, taking into consideration of the present specification and the claims.

In the present specification, the terms of "upward" and "downward" are based on the vertical direction, which is the direction of action of gravity, unless otherwise specified; the vertical direction is the downward direction, and the direction opposite to the vertical direction is the upward direction. The height direction is along the vertical direction, and the horizontal direction is a direction forming a right angle with the vertical direction. Further, the terms of "upstream" and "downstream" are based on the conveyance direction of a conveyance object, unless otherwise specified.

First Embodiment

Figure 2:
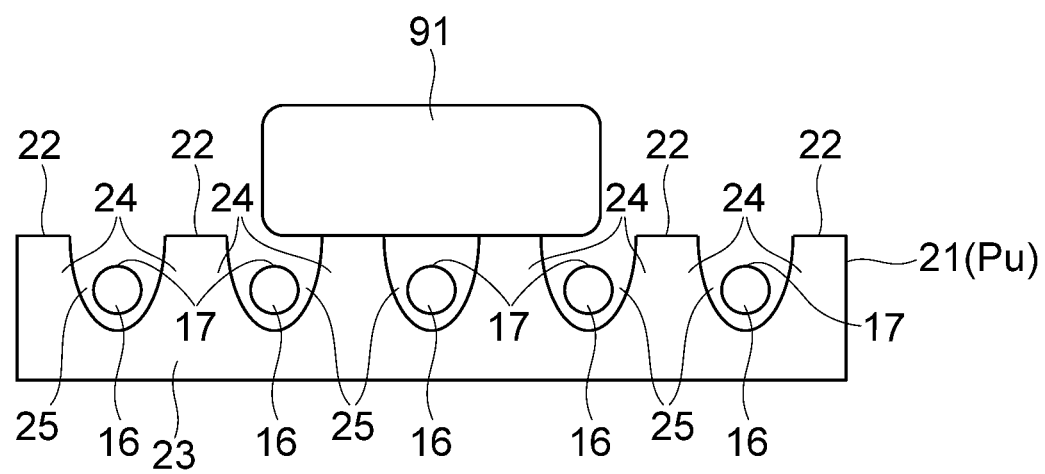
FIG. 2 is a schematic cross-sectional view showing a relation between a catcher positioned in a raised position and a first conveyance object.
Figure 3:
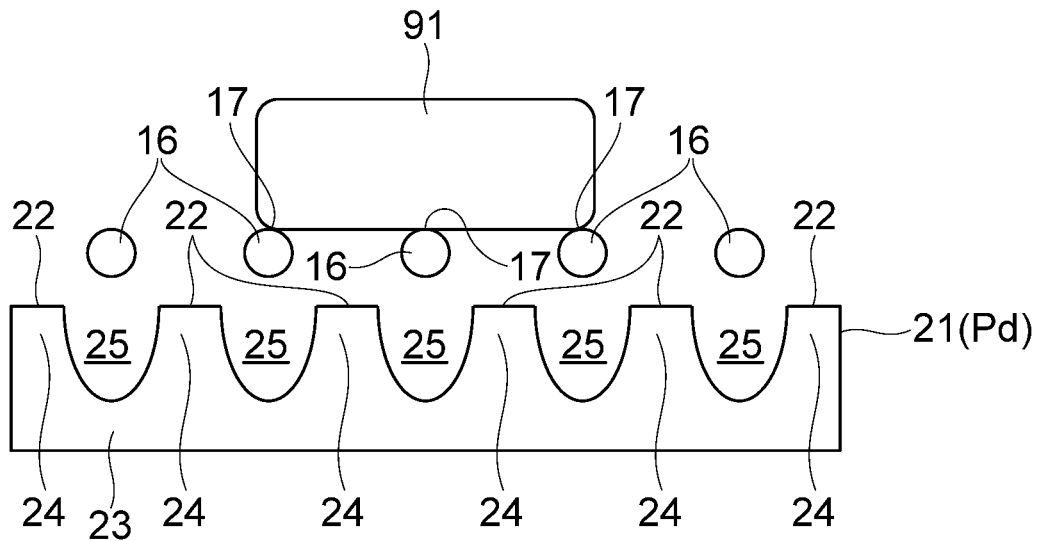
FIG. 3 is a schematic cross-sectional view showing a relation between the catcher positioned in a lowered position and the first conveyance object.

FIG. 1 is a side view schematically showing an example of a conveyance apparatus 10 according to a first embodiment. FIG. 2 is a schematic cross-sectional view showing a relation between a catcher 21 positioned in a raised position Pu and a first conveyance object 91. FIG. 3 is a schematic cross-sectional view showing a relation between the catcher 21 positioned in a lowered position Pd and the first conveyance object 91. In FIGS. 2 and 3, for convenience, only five conveyance bodies 16 are shown and only six protruding portions 24 are shown; however, the number of conveyance bodies 16 and protruding portions 24 is not limited, and more or fewer conveyance bodies 16 and/or more or fewer protruding portions 24 may be provided.

The conveyance apparatus 10 shown in FIG. 1 is an apparatus that conveys a first conveyance object 91 in a conveyance direction A1. The first conveyance object 91 is not limited and may be a solid, a liquid, and a mixture of a solid and a liquid, and may or may not have fluidity. The use of the first conveyance object 91 is also not limited, and the first conveyance objects 91 may be foods, daily necessities, industrial products, and various other objects used in other technical fields.

The conveyance apparatus 10 comprises a conveyor 15, a catcher 21, and a conveyance object supply unit 30.

The conveyor 15 includes a conveyance body 16 that moves in the conveyance direction A1, which is parallel to the horizontal direction. The upper surface of the conveyance body 16 constitutes a conveyance surface 17. The first conveyance object 91 supplied from the conveyance object supply unit 30 via the catcher 21 is placed on the conveyance surface 17. Over at least a part of the range (in the present embodiment, the entire of the range) over which the first conveyance object 91 is moved of the range over which the conveyance surface 17 travels, the conveyance surface 17 forms a flat surface that extends parallel to the horizontal direction.

The specific configuration of the conveyance body 16 is not limited. The conveyance body 16 has a configuration capable of conveying a first conveyance object 91 while properly holding the first conveyance object 91, and has a configuration suitable for processes performed by upstream devices and/or downstream devices which are not shown in FIG. 1. Typically, one or more belts having an endless shape can form the conveyance body 16. The cross-sectional size and the cross-sectional shape of a belt forming the conveyance body 16 are also not limited. For example, an endless-shaped belt having a cross-section in which the size in the lateral direction (e.g., the horizontal direction forming a right angle with the conveyance direction A1) is larger than the size in the lengthwise direction (e.g., the height direction) may be used for the conveyance body 16.

The conveyor 15 shown in drawings includes a plurality of string-shaped conveyance bodies 16 (see FIGS. 2 and 3). Each conveyance body 16 extends in the conveyance direction A1 and has a generally circular cross-section. These conveyance bodies 16 are located away from each other at equal distances in the horizontal direction forming a right angle with the conveyance direction A1. The conveyance surface 17 is formed by a set of outer peripheral surfaces (in particular, the upper surfaces facing upward) of the plurality of string-shaped conveyance bodies 16.

In the cross-section of each string-shaped conveyance body 16 (i.e., the cross-section forming a right angle with the traveling direction (i.e., the conveyance direction A1)), the size in the lateral direction (e.g., the horizontal direction) is equal to or less than the size in the lengthwise direction (e.g., the height direction) and is preferably less than the size in the lengthwise direction. The shape of the cross-section (in particular, the cross-section forming a right angle with the traveling direction) of each conveyance body 16 is not limited and each conveyance body 16 may have a cross-section of a polygonal shape, a circular shape (for example, a perfect circle shape or a shape of an ellipse) or another shape.

The catcher 21 has a placement surface 22 on which a first conveyance object 91 supplied from the conveyance object supply unit 30 is to be placed, and is provided to be able to be raised and lowered between the raised position Pu (see FIG. 2) and the lowered position Pd (see FIG. 3).

The specific configuration of the catcher 21 is not limited. The catcher 21 shown in drawings includes: a main body portion 23 that extends in a horizontal direction; and a plurality of protruding portions 24 that are provided to protrude upward from the main body portion 23. These protruding portions 24 are located away from each other at equal distances in the horizontal direction forming a right angle with the conveyance direction A1. Each protruding portion 24 extends in the conveyance direction A1 and is provided throughout the catcher 21 in the conveyance direction A1. An accommodation groove section 25 extending in the conveyance direction A1 is formed between adjacent protruding portions 24. Each accommodation groove section 25 is provided throughout the catcher 21 in the conveyance direction A1. The cross-sectional shape and the cross-sectional size of the accommodation groove sections 25 are not limited. In a state where the catcher 21 is positioned in the raised position Pu, each conveyance body 16 is positioned in a corresponding accommodation groove section 25 between protruding portions 24 in such a manner that the travel of each conveyance body 16 in the conveyance direction A1 is not interfered and that each conveyance body 16 does not protrude above the placement surface 22.

The top end surfaces of respective protruding portions 24 constitute the placement surfaces 22. When the catcher 21 is positioned in the raised position Pu (see FIG. 2), the placement surfaces 22 are located above the conveyance surface 17. When the catcher 21 is positioned at the lowered position Pd (see FIG. 3), the placement surfaces 22 are located below the conveyance surface 17. When the catcher 21 is positioned at the lowered position Pd, the placement surfaces 22 may be located at the same height as the conveyance surface 17.

When the catcher 21 moves between the raised position Pu and the lowered position Pd, at least a part of the catcher 21 (in the example shown in drawings, protruding portions 24) is raised and lowered passing through the spaces between conveyance bodies 16 located adjacent to each other.

The conveyance object supply unit 30 (see FIG. 1) places a first conveyance object 91 on placement surfaces 22 in such a manner that the first conveyance object 91 is received by the placement surfaces 22 above the conveyance surface 17. The relation between the timing when the conveyance object supply unit 30 releases a first conveyance object 91 and the timing when the catcher 21 moves toward the raised position Pu is not limited. For example, the conveyance object supply unit 30 may release a first conveyance object 91 toward placement surfaces 22 in a state where the catcher 21 is already positioned in the raised position Pu. In this case, since the first conveyance object 91 lands on the catcher 21 placed in a stopped state, the force that the first conveyance object 91 receives from the catcher 21 is relatively small. Also, the conveyance object supply unit 30 may release a first conveyance object 91 toward placement surfaces 22 while the catcher 21 is moving toward the raised position Pu. In this case, since a first conveyance object 91 is released from the conveyance object supply unit 30 simultaneously with the movement of the catcher 21, the time required for the series of processes can be shortened.

The catcher 21 moves from the raised position Pu to the lowered position Pd in a state where a first conveyance object 91 is placed on placement surfaces 22 (see FIG. 2), so that the first conveyance object 91 is received by the conveyance surface 17 (see FIG. 3) and is conveyed downstream by the conveyance bodies 16 (see the first conveyance object 91 and the arrow (i.e., a movement direction A2) indicated by the dotted lines in FIG. 1).

Figure 4:
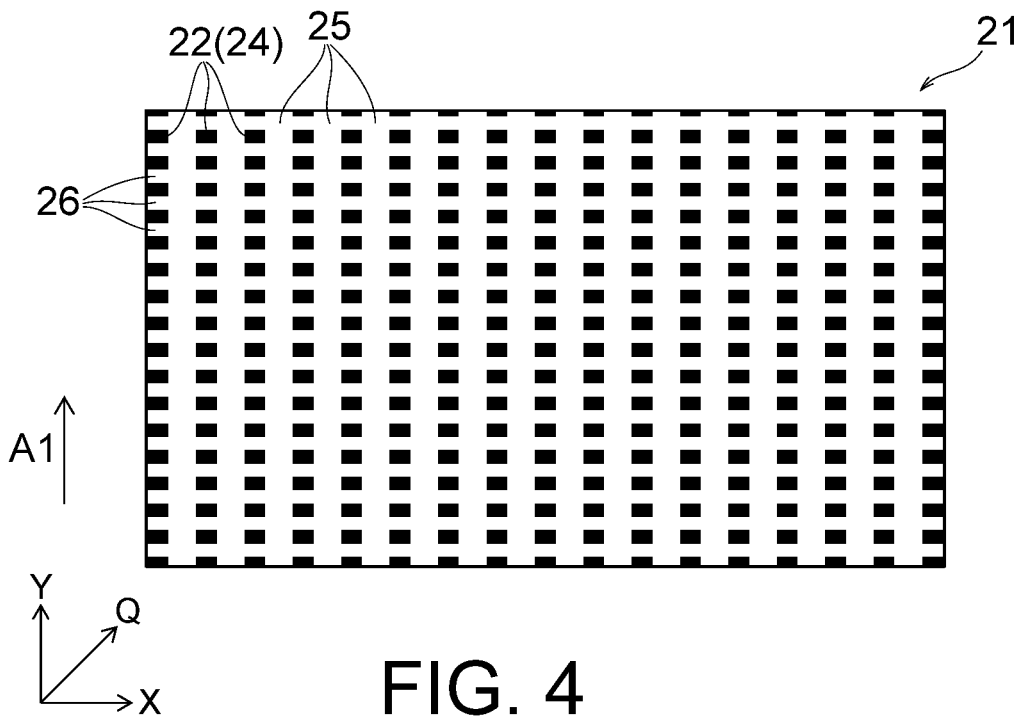
FIG. 4 is a plan view showing an example of the catcher (in particular, placement surfaces).

FIG. 4 is a plan view showing an example of the catcher 21 (in particular, the placement surfaces 22). For ease of understanding, in FIG. 4, the top end surfaces of the protruding portions 24 (i.e., the placement surfaces 22) are shown by solid black, and the grooves are shown by blank areas.

The catcher 21 shown in FIG. 4 includes a plurality of accommodation groove sections 25 extending in the conveyance direction A1 (i.e., the Y direction shown in FIG. 4) in addition to a plurality of engagement groove sections 26 extending in a direction which is not parallel to the conveyance direction A1 (in particular, in the horizontal direction forms a right angle with respect to the conveyance direction A1 (i.e., the X direction shown in FIG. 4)). Placement surfaces 22 and engagement groove sections 26 are alternately and repeatedly arranged on a straight line with respect to the conveyance direction A1 (i.e., the Y direction). A first conveyance object 91 that is placed on placement surfaces 22 is arranged to cover a plurality of engagement groove sections 26, and the holding force (i.e., the frictional force and/or the engagement force) is increased by these engagement groove sections 26.

In a case where a first conveyance object 91 falls from the conveyance object supply unit 30 toward the catcher 21 in a direction parallel to the vertical direction and placement surfaces 22 extend parallel to the horizontal direction, no horizontal force is basically applied to the first conveyance object 91 on the placement surfaces 22. However, in a case where a first conveyance object 91 moves toward the catcher 21 in a direction which is not parallel to the vertical direction or in a case where the placement surfaces 22 are tilted from the horizontal direction, a horizontal force is applied to the first conveyance object 91 on the placement surfaces 22. Even in such a case, since a first conveyance object 91 is held appropriately on the placement surfaces 22, where the holding force is increased by the accommodation groove sections 25 and the engagement groove sections 26, it is possible to effectively prevent the first conveyance object 91 on the placement surfaces 22 from slipping or rolling. In the example shown in FIG. 1, the conveyance object supply unit 30 releases a first conveyance object 91 toward the catcher 21, but the conveyance object supply unit 30 may place a first conveyance object 91 on placement surfaces 22 by other methods. For example, a first conveyance object 91 may be conveyed in a direction which is not parallel to the vertical direction by a transport conveyer not shown in the drawings and be moved from the transport conveyer onto placement surfaces 22 of the catcher 21. Even in such a case, the fact that the placement surfaces 22 have the accommodation groove sections 25 and the engagement groove sections 26 can effectively prevent a first conveyance object 91 on the placement surfaces 22 from slipping or rolling.

Each engagement groove section 26 may be shallower or deeper than the accommodation groove sections 25. The width of each engagement groove section 26 in the conveyance direction A1 (i.e., the Y direction) is also not limited, and each engagement groove section 26 may have a fine width of 1 mm or less.

The configuration of each engagement groove section 26 is not limited to the configuration shown in FIG. 4. For example, the engagement groove sections 26 may extend in the same direction as each other, or the catcher 21 includes two or more engagement groove sections 26 that extend in different directions from each other. In addition, the direction in which the engagement groove sections 26 extend is not limited, and each engagement groove section 26 may extend in a direction that is not parallel to each of the conveyance direction A1 (i.e., the Y direction) and the horizontal direction (i.e., the X direction shown in FIG. 4) forming a right angle with the conveyance direction A1 and that is oblique to each of these directions (i.e., the X direction and the Y direction). Further, the placement surfaces 22 (i.e., the top end surfaces of the protruding portions 24) may be arranged in a staggered pattern, and a set of "engagement groove sections 26, accommodation groove sections 25, and placement surfaces 22 arranged on a straight line" may be repeatedly provided with respect to the horizontal direction (i.e., the X direction) forming a right angle with the conveyance direction A1.

Further, the catcher 21 does not include the engagement groove sections 26. In a case where a first conveyance object 91 inherently has characteristics that make it difficult to slide or roll on the placement surfaces 22, the conveyance object supply unit 30 can stably place the first conveyance object 91 on the catcher 21 even if no engagement groove sections 26 are provided in the catcher 21.

Next, an example of the conveyance method performed by the conveyance apparatus 10 according to the present embodiment will be explained. In a case where a first conveyance object 91 is a food, the conveyance method performed by the conveyance apparatus 10 may have a role as a part of a food manufacturing method performed by a food manufacturing system that includes the conveyance apparatus 10.

The conveyance bodies 16 basically continue to move at a constant speed continuously in the conveyance direction A1 without stopping intermittently throughout the following processes being taking place. The conveyance surfaces 17 continuously move from upstream with respect to the conveyance object supply unit 30, to downstream with respect to the conveyance object supply unit 30, while passing below the conveyance object supply unit 30.

The catcher 21 is moved from the lowered position Pd to the raised position Pu. Meanwhile, the conveyance object supply unit 30 places a first conveyance object 91 on placement surfaces 22 in such a manner that the first conveyance object 91 is received by the placement surfaces 22 above the conveyance surfaces 17.

The catcher 21 is then moved from the raised position Pu to the lowered position Pd in a state where the first conveyance object 91 is placed on the placement surfaces 22. As a result, the first conveyance object 91 is received by the conveyance surfaces 17 to be delivered from the placement surfaces 22 to the conveyance surfaces 17. The first conveyance object 91 is then conveyed downstream by the conveyance bodies 16 in a state of being placed on the conveyance surfaces 17.

The above-mentioned raising and lowering operation of the catcher 21 and the release operation of a first conveyance object 91 from the conveyance object supply unit 30 are typically performed under the control of a control unit (not shown). However, it is not necessary to control the catcher 21 and/or the conveyance object supply unit 30 by the control unit as long as the raising and lowering operation of the catcher 21 and the release operation of a first conveyance object 91 from the conveyance object supply unit 30 can be interconnected as described above.

By repeatedly performing the above-mentioned raising and lowering operation of the catcher 21 and the release operation of a first conveyance object 91 from the conveyance object supply unit 30, a plurality of first conveyance objects 91 are placed gently on conveyance bodies 16 via the catcher 21 and are conveyed downstream in a continuous manner. In particular, since a first conveyance object 91 released from the conveyance object supply unit 30 is received by the catcher 21 that is not moving in the conveyance direction A1, the first conveyance object 91 is placed on the catcher 21 without being affected by inertia in the conveyance direction A1. Thus, it is possible to place a first conveyance object 91 on a desired section of the catcher 21 stably and accurately.

Also, by moving the catcher 21 downward in such a manner that the height position of the placement surfaces 22 is adjusted to the same height as the conveyance surfaces 17 or to a position lower than the height position of the conveyance surface 17, a first conveyance object 91 is delivered to the conveyance surfaces 17. In this manner, a first conveyance object 91 is supported by the placement surfaces 22 at least until just before the first conveyance object 91 is delivered to the conveyance surfaces 17, and therefore the first conveyance object 91 can be placed stably and accurately on the conveyance bodies 16.

As explained above, according to the conveyance apparatus 10 of the present embodiment, a first conveyance object 91 can be stably and accurately placed on conveyance bodies 16 while the first conveyance object 91 is conveyed by the conveyance bodies 16 at high speed. In a case where a first conveyance object 91 is placed directly on conveyance bodies 16 without using the catcher 21, there is a concern that the first conveyance object 91 may fall over on the conveyance bodies 16, be displaced or be damaged. According to the conveyance apparatus 10 of the present embodiment, such problems can be effectively avoided.

In addition, regardless of whether or not a first conveyance object 91 is released from the conveyance object supply unit 30 and regardless of the raised-lowered status of the catcher 21, there is no need to stop the conveyance bodies 16 and the conveyance bodies 16 can be made to travel continuously. This can prevent the stagnation of processing or the deterioration of processing speed on the upstream and downstream sides from conveyance object supply unit 30, and thus the improvement in the processing performance and the productivity of the system as a whole is not hindered by the placement step of a first conveyance object 91.

Second Embodiment

In the present embodiment, the same elements as or similar elements to those in the first embodiment described above are marked with common signs and their detailed description is omitted.

Figure 5:
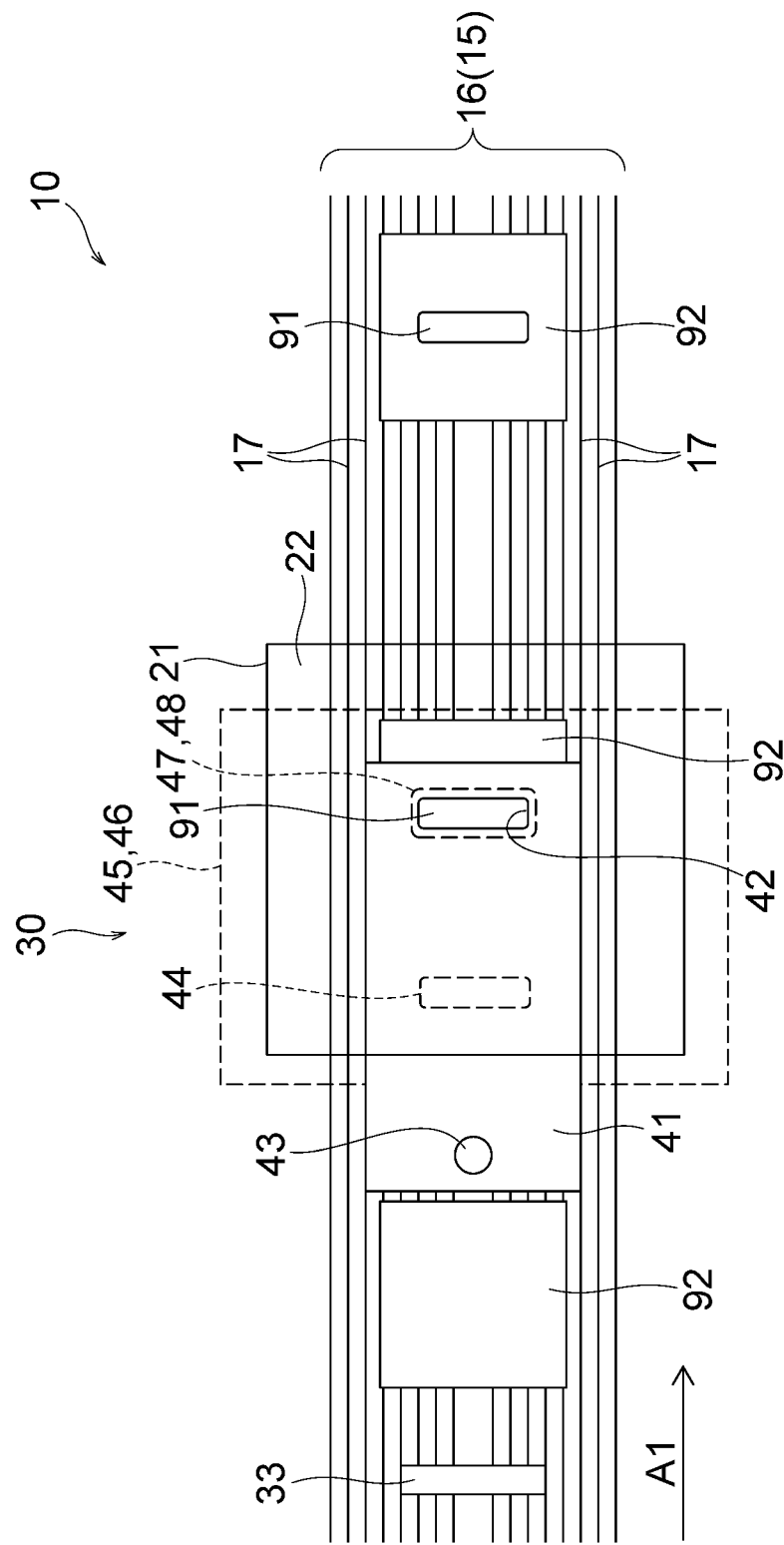
FIG. 5 is a plan view showing a schematic configuration of an example of a conveyance apparatus according to a second embodiment.
Figure 6:
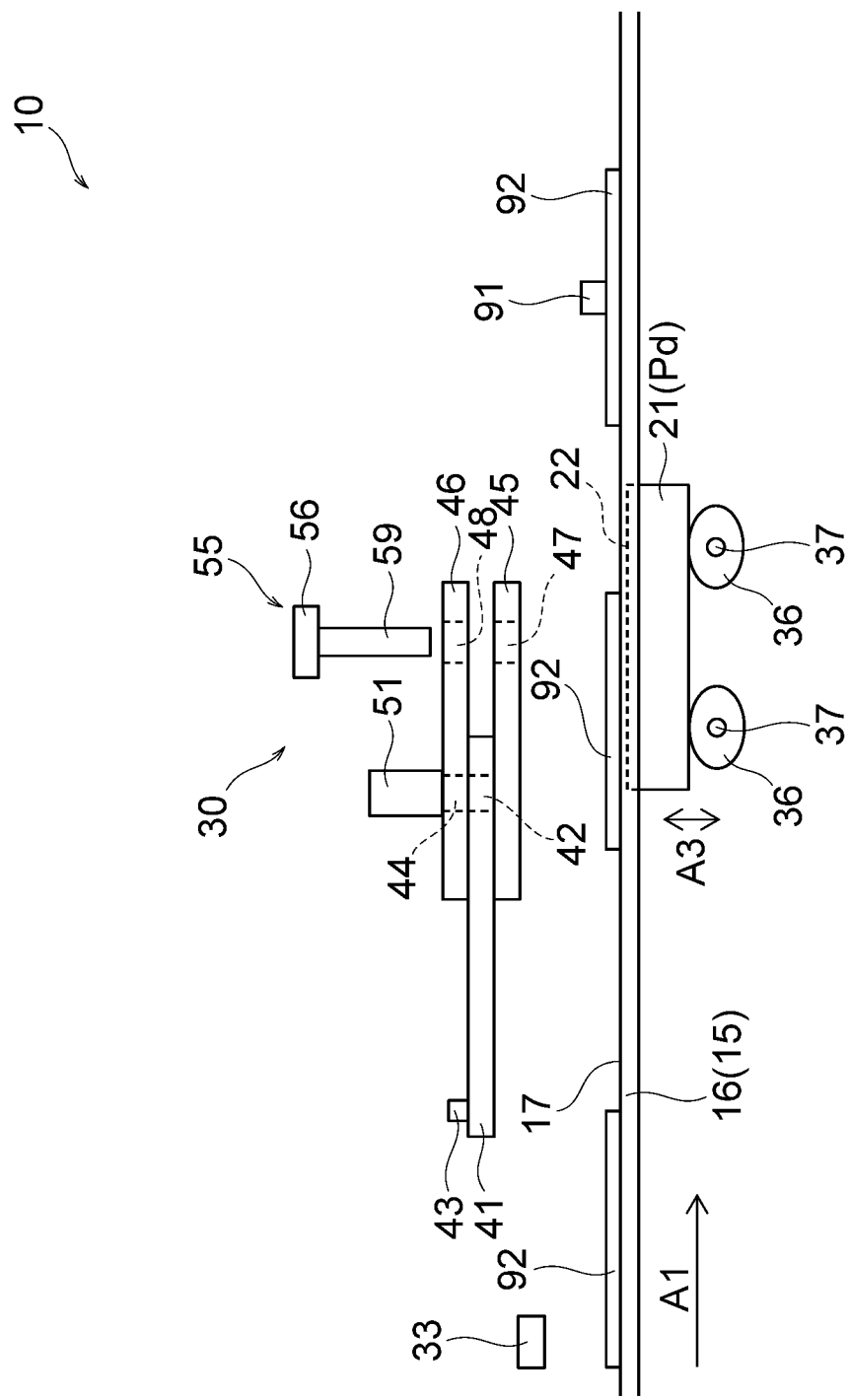
FIG. 6 is a side view schematically showing an example of the operating state of the conveyance apparatus shown in FIG. 5.
Figure 7:
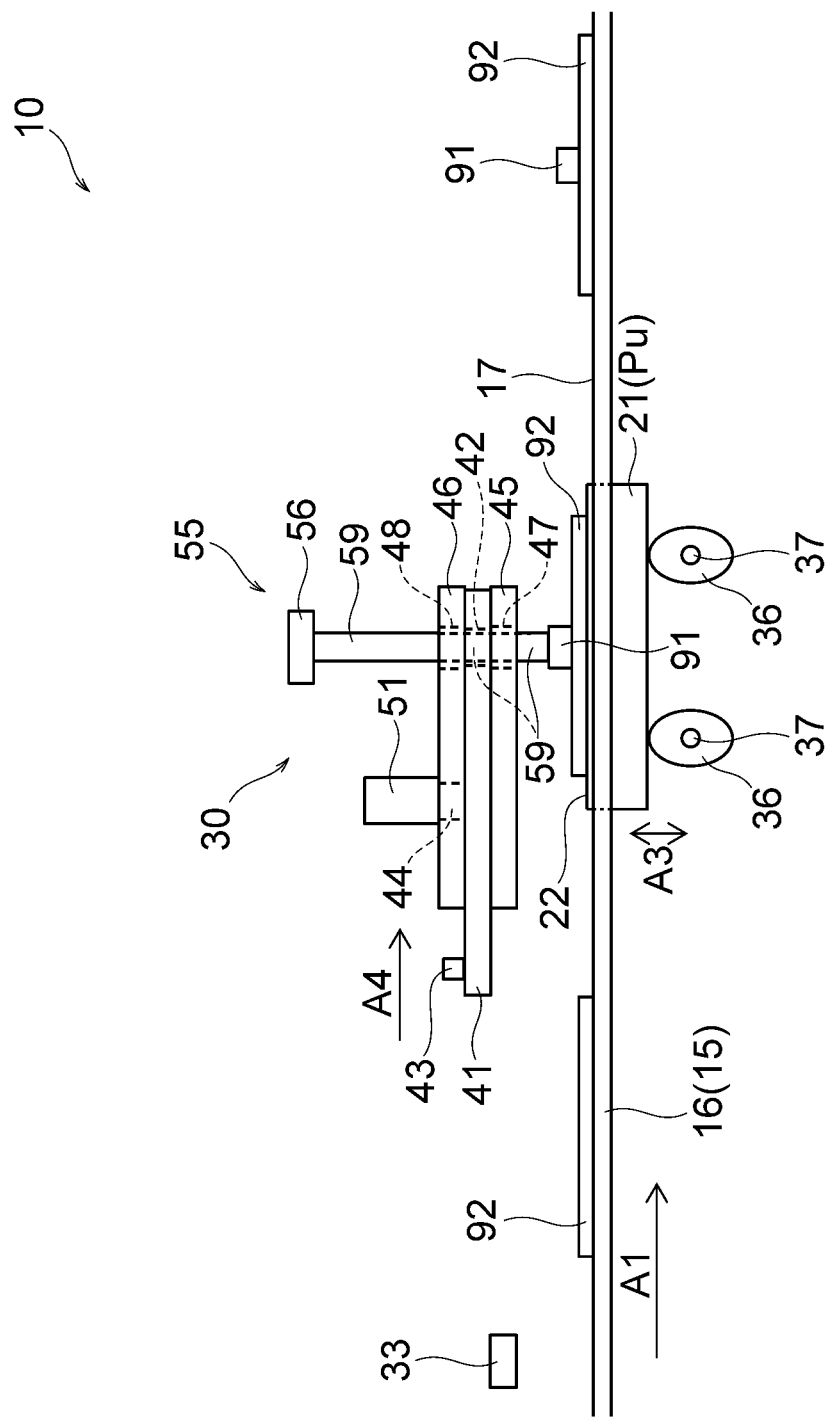
FIG. 7 is a side view schematically showing an example of the operating state of the conveyance apparatus shown in FIG. 5.
Figure 8:
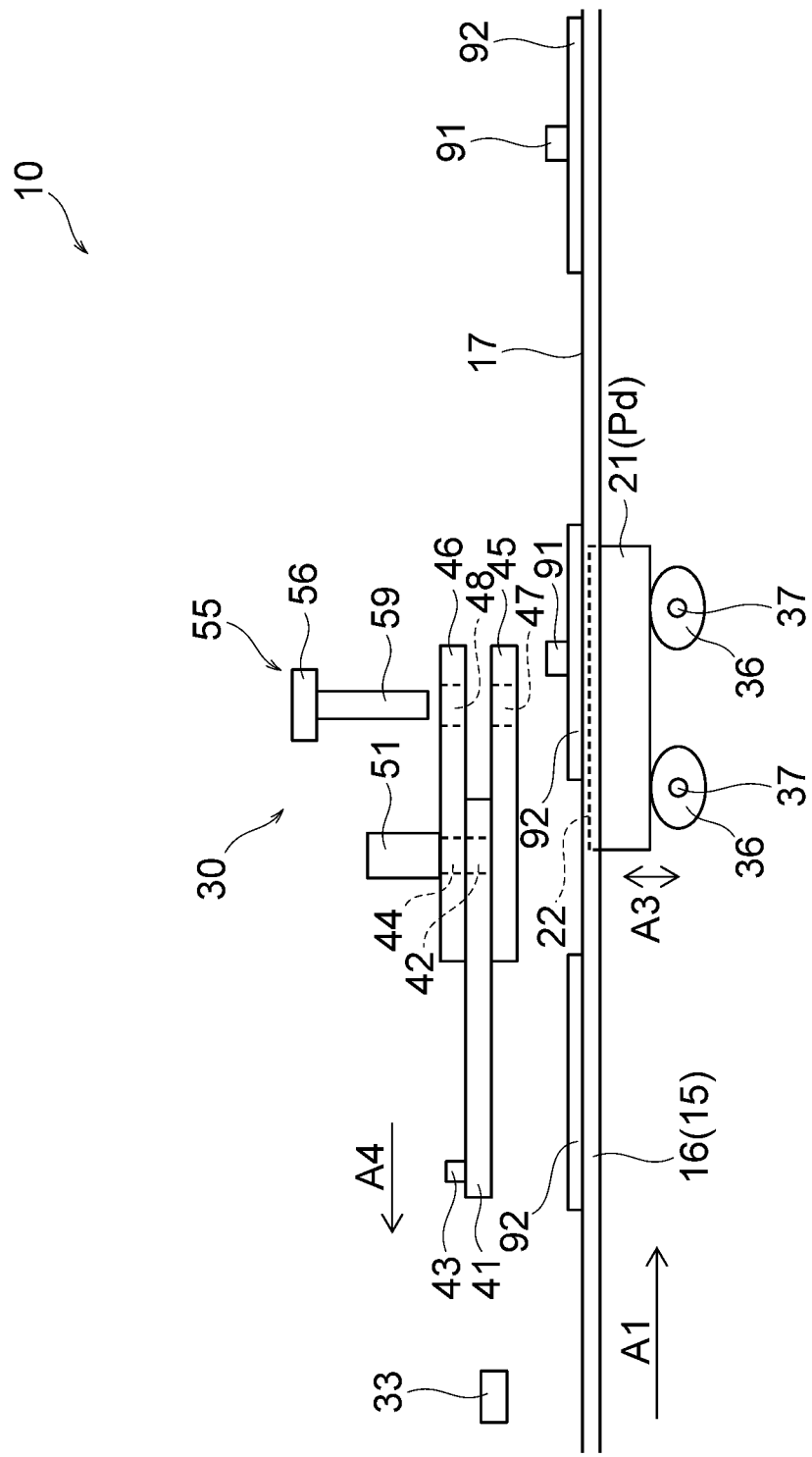
FIG. 8 is a side view schematically showing an example of the operating state of the conveyance apparatus shown in FIG. 5.
Figure 9:
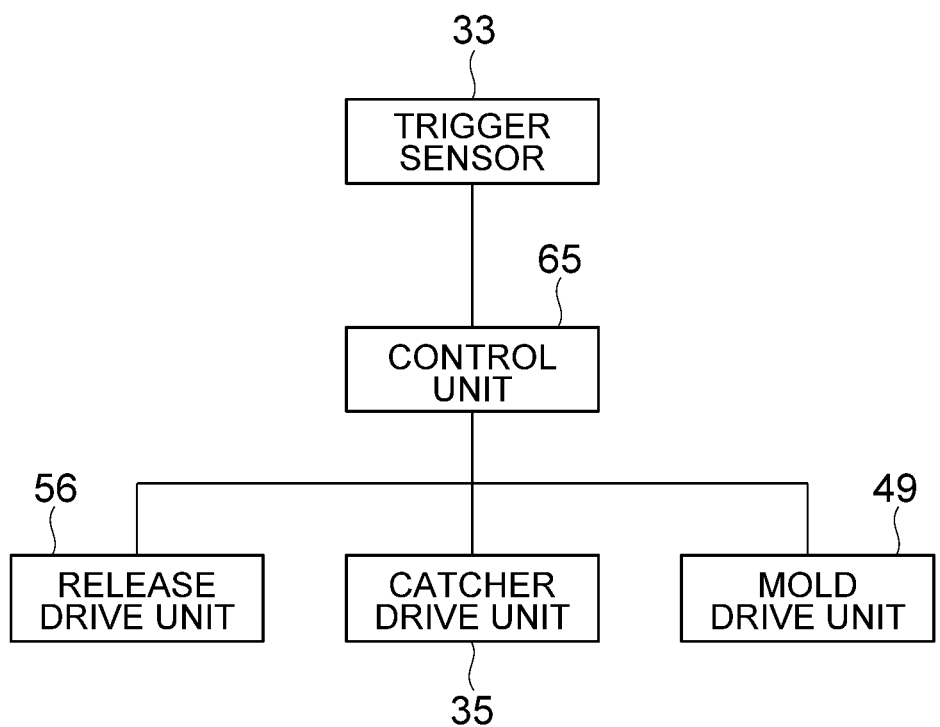
FIG. 9 is a block diagram showing an example of a control unit of the conveyance apparatus according to the second embodiment.

FIG. 5 is a plan view showing a schematic configuration of an example of a conveyance apparatus 10 according to a second embodiment. FIGS. 6 to 8 are side views schematically showing an example of the operating state of the conveyance apparatus 10 shown in FIG. 5. FIG. 9 is a block diagram showing an example of a control unit of the conveyance apparatus 10 according to the second embodiment. In FIG. 5, the illustration of an introduction unit 51 and a release unit 55 (see FIGS. 6 to 8) is omitted. Further, in FIG. 5, a holding case 45 (including a holding hole 47) and a top plate holding section 46 (including an introduction hole 44 and a top plate hole 48) are shown in a see-through state by dotted lines, in order to facilitate the understanding of the configuration of a mold 41.

In the conveyance apparatus 10 of the present embodiment, a first conveyance object 91 (i.e., an "installation workpiece") is placed on a second conveyance object 92 (i.e., a "receiving workpiece") conveyed from upstream by the conveyor 15, and a set of the first conveyance object 91 and the second conveyance object 92 is conveyed downstream.

A first conveyance object 91 and a second conveyance object 92 are not limited. Typically, a second conveyance object 92 has a sheet shape and a first conveyance object 91 can have a size such that the first conveyance object 91 can be wrapped with the second conveyance object 92. As an example, at least one of a first conveyance object 91 and a second conveyance object 92 may be plastic, and plastic that is fluid when heated may be used as a first conveyance object 91. As another example, at least one of a first conveyance object 91 and a second conveyance object 92 may be a foodstuff. For example, an ingredient can be used as a first conveyance object 91 while an edible skin for wrapping the ingredient as a second conveyance object 92. In the following description, a first conveyance object 91 is a paste-like foodstuff, and a second conveyance object 92 is a flexible sheet-like foodstuff that can be bent, and the conveyance apparatus 10 is configured as a part of a food manufacturing system.

The conveyance bodies 16 move in the conveyance direction A1 in a state where a second conveyance object 92 is placed on the conveyance surfaces 17. The catcher 21 is moved from the lowered position Pd to the raised position Pu in such a manner that the second conveyance object 92 is placed on placement surfaces 22 of the catcher 21 positioned in the raised position Pu. The conveyance object supply unit 30 places the first conveyance object 91 on the placement surfaces 22 in such a manner that the first conveyance object 91 lands on the second conveyance object 92 placed on the placement surfaces 22.

Similarly to the catcher 21 of the first embodiment, the catcher 21 of the present embodiment includes a plurality of accommodation groove sections 25 extending in the conveyance direction A1 in addition to a plurality of engagement groove sections 26 extending in a direction which is not parallel to the conveyance direction A1 (see FIG. 4). These accommodation groove sections 25 and engagement groove sections 26 (in particular, the engagement groove sections 26) increase the anti-slip effects for a second conveyance object 92 placed on placement surfaces 22, so that the catcher 21 can appropriately hold a second conveyance object 92.

The conveyance object supply unit 30 includes a mold 41 and a release unit 55. The mold 41 has a molding space 42 to be filled with a first conveyance object 91 and to mold the first conveyance object 91. The release unit 55 applies a force to the first conveyance object 91 to release the first conveyance object 91 positioned in the molding space 42 toward the placement surfaces 22 of the catcher 21.

The mold 41 shown in drawings extends horizontally between the holding case 45 and the top plate holding section 46 and is held so as to be able to slide freely in the horizontal direction (see the "slide direction A4" shown in FIGS. 7 and 8) along the holding case 45 and the top plate holding section 46. A mold moving body 43 is attached to the mold 41, and the mold moving body 3 is connected to a mold drive unit 49 (see FIG. 9) such as a motor. The mold 41 moves back and forth in the slide direction A4 while being guided by the holding case 45 and the top plate holding section 46, in response to the power transmitted from the mold drive unit 49 (see FIG. 9) to the mold moving body 43. The mold 41, which moves together with the mold moving body 3 in this way, can be arranged in a filling position (see FIGS. 6 and 8) for filling the molding space 42 with a first conveyance object 91 and in a release position for releasing a first conveyance object 91 from the molding space 42.

The top plate holding section 46 is provided above the holding case 45, and the holding case 45 and top plate holding section 46 are fixedly supported by a support frame not shown in the drawings. The introduction unit 51 is fixed onto the top plate holding section 46. The introduction unit 51 has an internal space (omitted in the drawings) through which a first conveyance object 91 can pass. The introduction unit 51 is connected to a supply device not shown in the drawings, and the internal space of the introduction unit 51 is supplied with a paste-like first conveyance object 91 from the supply device.

The top plate holding section 46 has the introduction hole 44 that is connected to the internal space of the introduction unit 51. When the mold 41 is positioned in the filling position, the molding space 42 is connected to the inner space of the introduction unit 51 via the introduction hole 44.

The top plate holding section 46 further has the top plate hole 48. The top plate hole 48 is located to overlap a punching member 59 of the conveyance object supply unit 30 with respect to the height direction, and has a shape and size such that the punching member 59 can freely pass through the top plate hole 48 in the height direction. When the mold 41 is arranged in the release position, the molding space 42 is located below the top plate hole 48 to overlap the punching member 59 and the top plate hole 48 with respect to the height direction, and has a shape and size such that the punching member 59 can freely pass through the molding space 42 in the height direction.

The release unit 55 shown in drawings includes a release drive unit 56 and the punching member 59 that is fixed to the release drive unit 56 and extends downward. The punching member 59 is driven by the release drive unit 56 in such a manner that the amount of protrusion of the punching member 59 downward from the release drive unit 56 is adjusted and the position of the lower tip of the punching member 59 changes in the height direction. Specifically, the lower tip of the punching member 59 can be arranged in a retreat position (see FIGS. 6 and 8) which is a position above the mold 41 (in the example shown in drawings, a position above the top plate holding section 46) and in a punching position (see FIG. 7) which is a position below the mold 41 (in the example shown in drawings, a position below the holding case 45). The release unit 55 shown in drawings is illustrated in a simplified manner, and the release drive unit 56 and the punching member 59 may have any configuration. For example, the release unit 55 can be configured by using an air cylinder or a ball screw mechanism.

The catcher 21 is located in a position which is directly below the punching member 59, the top plate hole 48 and the holding hole 47 and which is directly below the molding space 42 of the mold 41 arranged in the release position. The catcher 21 is placed on a plurality of drive cams 36 (in the example shown in drawings, two drive cams 36 provided side-by-side in the conveyance direction A1). Each drive cam 36 is driven by a catcher drive unit 35 (see FIG. 9) such as a motor and is rotated around a corresponding cam shaft 37. The cross-section of each drive cam 36 has an egg-shaped (e.g., elliptical) outer shape, and the height direction position of the outermost part of each drive cam 36 (specifically, the height direction position of the point that contacts the catcher 21) varies depending on the rotation state of each drive cam 36. These drive cams 36 are driven synchronously to have the same posture as each other and can be placed in a rotation state for arranging the catcher 21 in the lowered position Pd (see FIGS. 6 and 8) and in a rotation state for arranging the catcher 21 in the raised position Pu (see FIG. 7). The mechanism for synchronously driving the plurality of drive cams 36 is already known, and its detailed description is omitted.

A trigger sensor 33 is installed upstream from the conveyance object supply unit 30 and above the conveyance bodies 16. The trigger sensor 33 is a sensor that detects the passage of a second conveyance object 92 directly below the trigger sensor 33 and can be typically configured by an optical sensor. As shown in FIG. 9, the trigger sensor 33 is connected to a control unit 65, and the detection results of the trigger sensor 33 are sent to the control unit 65.

The control unit 65 controls the release drive unit 56, the catcher drive unit 35, and the mold drive unit 49 based on the detection results of the trigger sensor 33. Specifically, the release drive unit 56, the catcher drive unit 35, and the mold drive unit 49 are controlled according to the conveyance position of a second conveyance object 92, so that the movement of the punching member 59, the catcher 21 and the mold 4 is carried out in relation to each other.

Next, an example of the conveyance method performed by the conveyance apparatus 10 according to the present embodiment will be explained.

The conveyance bodies 16 basically continues to move at a constant speed continuously in the conveyance direction A1 without stopping intermittently throughout the following processes being taking place. Meanwhile, a plurality of second conveyance objects 92 are placed on conveyance bodies 16 of the conveyor 15 in a state of being spaced apart from each other with respect to the conveyance direction A1 (see FIG. 6). The operation of placing a plurality of second conveyance objects 92 on conveyance bodies 16 may be done by machine or by hand.

Second conveyance objects 92 are conveyed in the conveyance direction A1 by the conveyance bodies 16, are detected by the trigger sensor 33 on the upstream side from the conveyance object supply unit 30, and are lifted from the conveyance surfaces 17 by the catcher 21 at timings when the second conveyance objects 92 reach a desired position above the catcher 21 (specifically, directly below the punching member 59) (see FIG. 7). The control unit 65 calculates the time for a second conveyance object 92 to reach the desired position above the catcher 21 (i.e., directly below the punching member 59) based on the detection results of the trigger sensor 33 and the traveling speed of the conveyance bodies 16. The control unit 65 controls the catcher drive unit 35 based on said calculation results, and thus controls the rotation state of each drive cam 36. Until a second conveyance object 92 reaches the desired position above the catcher 21 (i.e., directly below the punching member 59), the catcher 21 is positioned at the lowered position Pd and the placement surfaces 22 are located below the conveyance surfaces 17. On the other hand, the catcher 21 is moved upward by the drive cams 36 at a timing when a second conveyance object 92 reaches the desired position above the catcher 21 (i.e., directly below the punching member 59). As a result, the catcher 21 is arranged in the raised position Pu, the placement surfaces 22 are placed above the conveyance surfaces 17, and the second conveyance object 92 is placed on placement surfaces 22 and get separated from the conveyance surfaces 17 that are moving continuously in the conveyance direction A1. In this way, a second conveyance object 92 is positioned in a fixed manner with respect to the conveyance direction A1 by the catcher 21 without stopping the conveyance bodies 16.

On the other hand, before a second conveyance object 92 reaches a position above the catcher 21 (i.e., directly below the punching member 59), the mold 41 is arranged in the filling position, and the molding space 42 is filled with a first conveyance object 91 via the introduction unit 51 and the introduction hole 44. After the molding space 42 is filled with the first conveyance object 91, the mold 41 is moved from the filling position to the release position. As a result, the first conveyance object 91 is formed into a desired shape according to the shape of the molding space 42. Then, according to a timing when a second conveyance object 92 is lifted by the catcher 21, the punching member 59 is lowered to pass through the top plate hole 48, the molding space 42 and the holding hole 47. As a result, the first conveyance object 91 in the molding space 42 of the mold 41 which is arranged in the release position, is pushed downward by the punching member 59, so that the first conveyance object 91 is placed on the second conveyance object 92 on placement surfaces 22 of the catcher 21.

After a first conveyance object 91 is placed on a second conveyance object 92, the drive cams 36 are rotated under the control of the control unit 65 in such a manner that the catcher 21 is arranged in the lowered position Pd (see FIG. 8). As a result, the first conveyance object 91 and second conveyance object 92 on the placement surfaces 22 are placed on the conveyance surfaces 17 of conveyance bodies 16 and get separated from the placement surfaces 22. The first conveyance object 91 and the second conveyance object 92 placed on the conveyance surfaces 17 are conveyed downstream by the conveyance bodies 16.

The punching member 59 is moved from the punching position to the retreat position after punching out a first conveyance object 91 from the molding space 42. After that, the mold 41 is moved from the release position to the filling position. Then, the molding space 42 of the mold 41 which is arranged in the filling position, is filled with a new first conveyance object 91 which is sent through the internal space of the introduction unit 51 and the introduction hole 44.

By repeatedly performing the above-descried series of processes under the control of the control unit 65, sets of a first conveyance object 91 and a second conveyance object 92 can be continuously sent downstream from the conveyance object supply unit 30.

As explained above, according to the present embodiment, a first conveyance object 91 can be conveyed downstream in a state of being placed on a second conveyance object 92. In particular, since the process of placing a first conveyance object 91 on a second conveyance object 92 is performed in a state where the second conveyance object 92 is stopped with respect to the conveyance direction A1, the first conveyance object 91 can be accurately arranged at a desired position on the second conveyance object 92 without being affected by inertia in the conveyance direction A1.

If a first conveyance object 91 is arranged in a position that is out of the desired position of the second conveyance object 92, it may cause a blockage in a process performed in a subsequent stage or may cause deterioration in the quality of a final product, such as poor shape. According to the conveyance apparatus 10 of the present embodiment, such a problem in a process performed in a subsequent stage and such deterioration in the quality of a final product can be effectively avoided.

Further, as shown in drawings, when a first conveyance object 91 is punched out of the molding space 42, it is inevitable that the first conveyance object 91 will be subjected to impact when landing. However, according to the present embodiment, since a first conveyance object 91 lands on a second conveyance object 92 in a state where the second conveyance object 92 is being lifted by the catcher 21, the impact force applied to the first conveyance object 91 can be reduced. As described above, the configuration in which when a first conveyance object 91 is punched out of the molding space 42, the placement surfaces 22 of the catcher 21 are raised in such a manner that the falling distance of a first conveyance object 91 is shorten as in the present embodiment, is suitable from a viewpoint of reducing the impact force acting on the first conveyance object 91.

In addition, even in a case where a first conveyance object 91 is pressed against a second conveyance object 92 by the punching member 59 when the first conveyance object 91 is punched out from the molding space 42, the catcher 21 does not move in the horizontal direction, and thus no force or little force in the horizontal direction is exerted on the first conveyance object 91. Therefore, no or little relative positional misalignment in the horizontal direction occurs between a first conveyance object 91 and a second conveyance object 92. Further, even if it is difficult to remove a first conveyance object 91 from the punching member 59 due to the strong adhesiveness of the first conveyance object 91, the first conveyance object 91 can be effectively peeled off from the punching member 59 and be placed on a second conveyance object 92 by pressing the first conveyance object 91 against the second conveyance object 92 with the punching member 59.

Further, if the size in the height direction of a first conveyance object 91 is changed, it may be required to change the height direction position of the lower tip of the punching member 59 that is placed in the punching position. Even in such a case, the height direction position of the lower tip of the punching member 59 can be easily changed by changing the amount of drive of the punching member 59 by the release drive unit 56 (i.e., the amount of protrusion of the punching member 59 downward from the release drive unit 56).

Modification Example

The shape of the catcher 21 is not limited. For example, the catcher 21 may be configured by a set of a plurality of projecting bodies that are provided separately from each other. Two or more of the plurality of projecting bodies may be disposed apart from each other with respect to the conveyance direction A1, and may be disposed apart from each other with respect to the horizontal direction forming a right angle with the conveyance direction A1. It is easier to handle the catcher 21 if the number of components that make up the catcher 21 is small, and by configuring the entire catcher 21 with an integral member, it is often advantageous in terms of ease of handling and manufacturing cost of the catcher 21.

The ability of the catcher 21 to hold a first conveyance object 91 and/or a second conveyance object 92 may be improved by other means, together with or instead of the engagement groove sections 26. For example, the placement surfaces 22 may be configured with a rough surface to improve the frictional force of the placement surfaces 22. Further, the holding ability of the catcher 21 may be improved by applying any treatment (for example, a physical treatment and/or a chemical treatment) for improving the friction force to the placement surfaces 22.

When a first conveyance object 91 is released from the molding space 42, the punching member 59 does not have to penetrate the molding space 42, and the lower tip of the punching member 59 entering the molding space 42 may be stopped in the molding space 42. Further, the method and the means of releasing a first conveyance object 91 from the molding space 42 are not limited. For example, the conveyance object supply unit 30 may blow compressed air into the molding space 42 to release a first conveyance object 91 from the molding space 42 toward the catcher 21.

The composition, shape, size, and other characteristics of the conveyance bodies 16 are not limited. For example, from a viewpoint of holding a first conveyance object 91 or a second conveyance object 92 in a stable manner, the conveyance bodies 16 are preferably configured by a member (for example, a wide belt) having a large contact area with a first conveyance object 91 or a second conveyance object 92, and the entire lower surface of a first conveyance object 91 is preferably supported by the conveyance bodies 16. On the other hand, from a viewpoint of ensuring good mold release properties with respect to a first conveyance object 91 or a second conveyance object 92, the conveyance bodies 16 are preferably configured by a member (for example, a string-shaped member) having a small contact area with a first conveyance object 91 or a second conveyance object 92. Therefore, when the adhesive property of a first conveyance object 91 or a second conveyance object 92 is strong (for example, when a first conveyance object 91 or a second conveyance object 92 has a high water content), string-shaped members can be suitably used as the conveyance bodies 16.

The conveyance object supply unit 30 and/or the conveyor 15 may be provided to be able to move in the height direction. In this case, the distance in the height direction between the conveyance object supply unit 30 and the conveyor 15 (in particular, the conveyance bodies 16 (specifically, the conveyance surfaces 17)) can be changed. In general, the conveyor 15 is often not easily moved. In such a case, from a viewpoint of reducing the workload, it is preferable to change the distance between the conveyance object supply unit 30 and the conveyor 15 by changing the position in the height direction of the conveyance object supply unit 30.

As described above, the conveyance bodies 16 and the catcher 21 may be provided in positions where the conveyance bodies 16 and the catcher 21 overlap each other with respect to the height direction, but the conveyance bodies 16 and the catcher 21 may be provided in positions where the conveyance bodies 16 and the catcher 21 do not overlap each other with respect to the height direction. For example, it is possible that a first conveyance object 91 or a second conveyance object 92 has relatively high rigidity, and the first conveyance object 91 or the second conveyance object 92 conveyed while only both ends of the first conveyance object 91 or the second conveyance object 92 (i.e., both ends in the horizontal direction forming a right angle with the conveyance direction A1) are placed on conveyance bodies 16. In this case, the conveyance bodies 16 which are provided separately from each other may be installed in positions corresponding respectively to both ends of a first conveyance object 91 or a second conveyance object 92, and the catcher 21 may be installed between these conveyance bodies 16. In this case, the catcher 21 can be provided in such a manner that the catcher 21 does not overlap the conveyance bodies 16 in the height direction and is able to contact the center part of a first conveyance object 91 or a second conveyance object 92.

As described above, the composition, shape, size, and other characteristics of a first conveyance object 91 and a second conveyance object 92 are not limited. For example, a first conveyance object 91 and a second conveyance object 92 may comprise the following elements.

A first conveyance object 91 may contain an irregularly shaped paste-like foodstuff (e.g., a viscous foodstuff) that is fluid, and may consist of a single type of foodstuff or may contain multiple types of foodstuffs. For example, a first conveyance object 91 may also contain meat, seafood, vegetables, mushrooms, grains, fruits, seaweed, beans, chocolate, cookies, crackers, puff, candies, gummies, and other solid foodstuffs as well as eggs, milk, water, oils, seasonings, spices, sugars, grain flours, starches, gelling agents, thickening agents, other liquid ingredients, other viscous foodstuffs (e.g., broth, sauces, creams, etc.), and foaming foodstuffs (e.g., whipped cream, etc.). Further, a first conveyance object 91 may contain a plurality of raw materials in different states (e.g., a solid raw material and a liquid raw material). In addition, ingredients used for foods such as spring rolls, burritos, tacos, crepes, hamburgers, croquettes, fried foods, processed minced foods (e.g., a foodstuff called Satsuma-age), processed tofu foods (e.g., a bean curd called Ganmodoki), Japanese sweets (e.g., a foodstuff called Imagawa-yaki), waffles (e.g., a foodstuff called Harajuku-dog (registered trademark)), various batters, and steamed dumplings called raviolis a la vapeur and jiao-zi, may be used as a first conveyance object.

A second conveyance object 92 may be configured by, for example, a flexible sheet-like member that can be easily bent. Therefore, an edible skin (e.g., a skin made of rice flour, wheat flour, or eggs) and a packaging member (e.g., a wrapping paper) for wrapping the above-mentioned edible ingredients (i.e., a first conveyance object 91), may be used as a second conveyance object 92. Edible materials and inedible materials used for purposes other than wrapping a first conveyance object 91 may also be used as a second conveyance object 92.

The present disclosure is not limited to the embodiments and the modification examples described above. For example, various modifications may be added to each element of the embodiments and the modification examples described above. Aspects including constituent elements and/or methods other than the above-described constituent elements and/or methods are also included in the embodiments of the present disclosure. Also, aspects in which some elements of the above-described constituent elements and/or methods are not included are also included in the embodiments of the present disclosure. Also, aspects that include some constituent elements and/or methods included in a certain embodiment of the present disclosure and some constituent elements and/or methods included in another embodiment of the present disclosure are also included in the embodiments of the present disclosure. Therefore, constituent elements and/or methods included in each of the embodiments and modification examples which are described above and embodiments and modification examples which are not described above may be combined with each other, and aspects according to such combinations are also included in the embodiments of the present disclosure. Further, the effects produced by the present disclosure are also not limited to the effects described above, and effects specific to the specific configuration of each embodiment may also be produced. As described above, various additions, changes, and partial deletions may be made to each element described in the claims, specification, abstract, and drawings, without departing from the technical idea and purpose of the present disclosure.

REFERENCE SIGNS LIST

10 Conveyance apparatus
15 Conveyor
16 Conveyance body
17 Conveyance surface
21 Catcher
22 Placement surface
23 Main body portion
24 Protruding portion
25 Accommodation groove section
26 Engagement groove section
30 Conveyance object supply unit
33 Trigger sensor
35 Catcher drive unit
36 Drive cam
37 Cam shaft
41 Mold
42 Molding space
43 Mold moving body
44 Introduction hole
45 Holding case
46 Top plate holding section
47 Holding hole
48 Top plate hole
49 Mold drive unit
51 Introduction unit
55 Release unit
56 Release drive unit
59 Punching member
65 Control unit
91 First conveyance object
92 Second conveyance object
A1 Conveyance direction
A2 Movement direction
A3 Raising-lowered direction A4 Slide direction
Pu Raised position
Pd Lowered position

The invention claimed is:

1. A conveyance apparatus comprising:
a conveyor which includes a conveyance body having a conveyance surface, the conveyance body being moved in a conveyance direction;
a catcher which has a placement surface; and
a conveyance object supply unit which places a first conveyance object onto the placement surface, wherein:
the catcher is moved to be arranged in a raised position where the placement surface is located above the conveyance surface, and in a lowered position where the placement surface is located at a same height as the conveyance surface or where the placement surface is located below the conveyance surface,
the conveyance object supply unit places the first conveyance object onto the placement surface in such a manner that the first conveyance object is received by the placement surface above the conveyance surface,
the catcher is moved from the raised position toward the lowered position in a state where the first conveyance object is placed on the placement surface, so that the first conveyance object is received by the conveyance surface and is conveyed downstream by the conveyance body,
the catcher includes: a main body portion extending in a horizontal direction; and a plurality of protruding portions which are provided to protrude upward from the main body portion,
each of the plurality of protruding portions constitutes the placement surface, and
the conveyance body is positioned between protruding portions in a state where the catcher is arranged in the raised position.

2. The conveyance apparatus as defined in claim 1, wherein:
the conveyor includes a plurality of conveyance bodies located away from each other in a horizontal direction, and
when the catcher is moved between the raised position and the lowered position, at least a part of the catcher passes through a space between conveyance bodies adjacent to each other.

3. The conveyance apparatus as defined in claim 1, wherein the catcher includes a groove section on the placement surface, the groove section extending in a direction which is not parallel to the conveyance direction.

4. A conveyance apparatus comprising:
a conveyor which includes a conveyance body having a conveyance surface, the conveyance body being moved in a conveyance direction;
a catcher which has a placement surface; and
a conveyance object supply unit which places a first conveyance object onto the placement surface, wherein:
the catcher is moved to be arranged in a raised position where the placement surface is located above the conveyance surface, and in a lowered position where the placement surface is located at a same height as the conveyance surface or where the placement surface is located below the conveyance surface,
the conveyance object supply unit places the first conveyance object onto the placement surface in such a manner that the first conveyance object is received by the placement surface above the conveyance surface,
the catcher is moved from the raised position toward the lowered position in a state where the first conveyance object is placed on the placement surface, so that the first conveyance object is received by the conveyance surface and is conveyed downstream by the conveyance body, and
the conveyance object supply unit includes:
a mold which has a molding space; and
a release unit which applies a force to the first conveyance object positioned in the molding space in such a manner that the first conveyance object is released toward the placement surface.

5. The conveyance apparatus as defined in claim 1, wherein:
the conveyance body is moved in the conveyance direction in a state where a second conveyance object is placed on the placement surface,
the catcher is moved from the lowered position to the raised position in such a manner that the second conveyance object is placed onto the placement surface of the catcher arranged in the raised position, and
the conveyance object supply unit places the first conveyance object onto the placement surface in such a manner that the first conveyance object lands on the second conveyance object placed on the placement surface.

6. The conveyance apparatus as defined in claim 5, wherein the second conveyance object is a flexible sheet-like member.

7. The conveyance apparatus as defined in claim 1, wherein the first conveyance object is a paste-like foodstuff.

8. A food production method including the steps of:
causing a conveyance body which is included in a conveyor and has a conveyance surface to move in a conveyance direction;
causing a catcher having a placement surface to move from a lowered position where the placement surface is located at a same height as the conveyance surface or where the placement surface is located below the conveyance surface, to a raised position where the placement surface is located above the conveyance surface;
causing a conveyance object supply unit to place a first conveyance object onto the placement surface in such a manner that the first conveyance object is received by the placement surface above the conveyance surface; and
causing the catcher to move from the raised position toward the lowered position in a state where the first conveyance object is placed on the placement surface in such a manner that the first conveyance object is received by the conveyance surface and is conveyed downstream by the conveyance body,
wherein the first conveyance object is a paste-like foodstuff.

* * * * *